Jan. 8, 1963
H. E. HALL, JR
3,072,791
RADIOACTIVITY WELL LOGGING
Filed Dec. 7, 1959
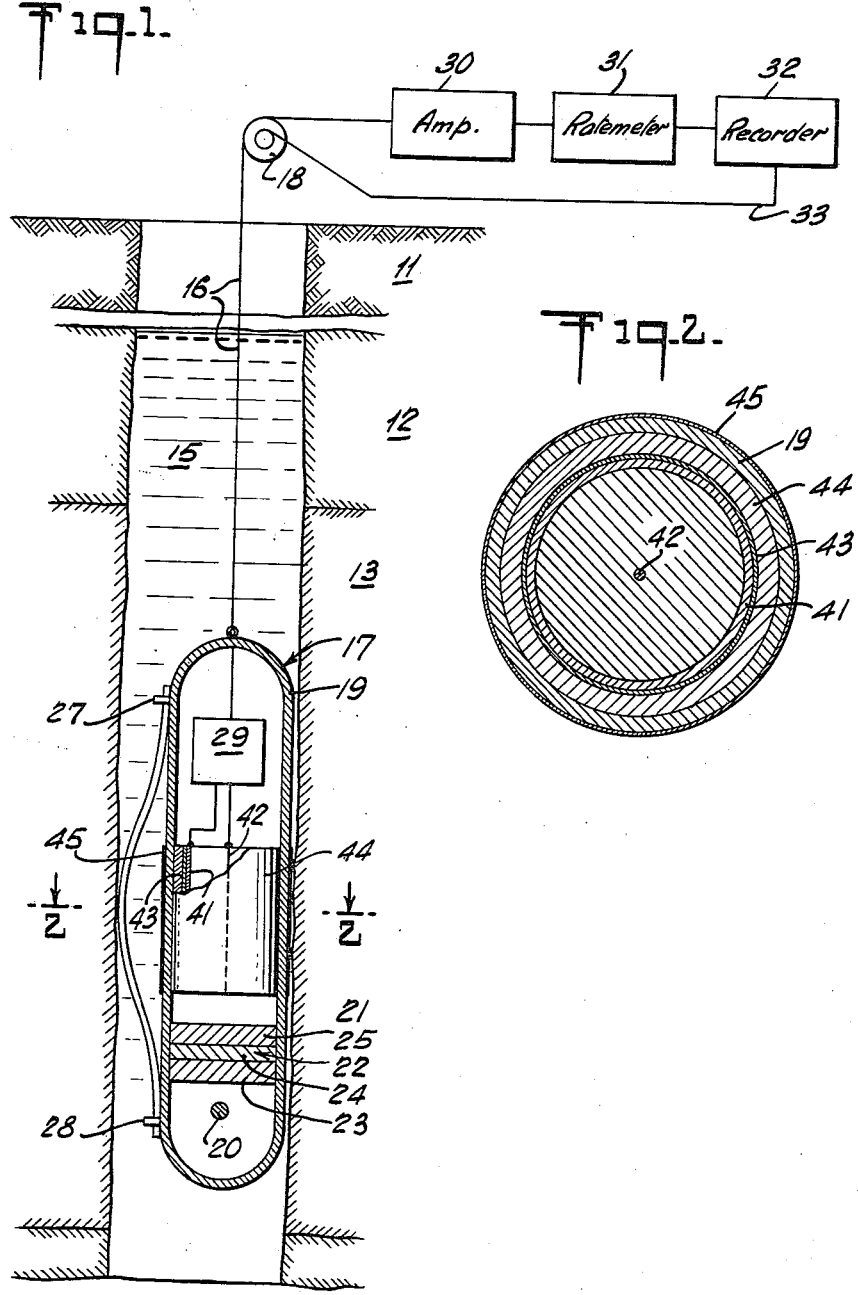

3,072,791
RADIOACTIVITY WELL LOGGING
Hugh E. Hall, Jr., Houston, Tex., assignor to Texaco Inc., New York, N.Y., a corporation of Delaware
Filed Dec. 7, 1959, Ser. No. 857,883
7 Claims. (Cl. 250—83.3)

The present invention relates generally to improvements in methods and apparatus for determining the nature of earth formations along the traverse of a bore hole and, more particularly, it is concerned with improvement for conducting neutron logs and is particularly directed toward improvements for the detection of neutrons.

Accordingly, it is a general object of the present invention to provide improvements in radioactivity well logging wherein a source of neutrons is employed to produce an observable effect indicative of the nature of the formations and wherein this effect is determined by detecting neutrons resulting in the formation.

It is well known to analyze earth formations in situ along the traverse of a bore hole through the use of various radioactivity analysis techniques including those known as neutron-neutron logs wherein a source of neutrons is passed through the bore hole to irradiate the earth formations and neutrons are detected in the bore hole as an indication of a characteristic of the formation. Such logs may be employed to determine the hydrogen content of the earth formations along the bore hole since the neutron flux at a certain distance from the neutron source is proportional to the ability of the earth formations to slow down the fast neutrons from the source. Hydrogen, the lightest of elements, is the most effective element in slowing down the fast neutrons from the source, therefore a neutron log may provide a good indication of the quantity of hydrogen present in the formation.

When fast neutrons from the source are slowed to the thermal energy range they are often captured by material present in the formation with the resultant emission of gamma radiation. In many cases, such as when a radium-beryllium source is used to provide the fast neutrons, there is also emitted by the source a significant flux of gamma radiation. Moreover, there is ordinarily present in the formation a natural gamma radiation component or background radiation. It will be apparent therefore that the neutron detector will be affected by the presence of these various gamma radiation components unless it is insensitive to the gamma radiation. Accordingly, it is a further object of the present invention to provide improvements in radioactivity well logging apparatus including a neutron detector which is substantially insensitive to the presence of gamma radiation.

Briefly stated, in accordance with one aspect of the present invention, there are provided methods and apparatus for logging earth formations along the traverse of a bore hole including the irradiation of the formations with fast neutrons and the detection of neutrons resulting in the formation in response to irradiation by the fast neutrons, which detection is accomplished through the instrumentality of a gamma ray sensitive counter surrounded by a thin foil of hafnium to provide material for resonance interaction with neutrons of predetermined energy with resultant emission of gamma rays that are, in turn, detected by the gamma ray counter. The gamma ray counter and its surrounding layer of hafnium are, in turn, surrounded by a shield of dense material such as lead or tungsten to shield the counter from undesired external gamma radiation. Advantageously, a layer of cadmium is provided around the outside of the housing of the logging instrument in the vicinity of the detector in order to intercept thermal neutrons which might otherwise reach the hafnium layer and to prevent the thermal neutrons from reaching the housing of the logging instrument where they might be captured with the resultant emission of undesirable gamma radiation which would also interfere with the logging signal.

For additional objects and advantages and for a better understanding of the invention, attention is now directed to the following detailed description and accompanying drawing. The features of the invention which are believed to be novel are particularly pointed out in the appended claims.

In the drawings:

FIG. 1 illustrates a side elevational view, partly in cross section, showing a well logging instrument positioned in a bore hole passing through a series of earth formations; and, FIG. 2 is a cross-sectional view through the lines 2—2 of FIG. 1.

Referring particularly to FIG. 1 of the drawing, there is shown a bore hole 10 traversing a plurality of earth formations 11, 12, 13 and 14 and containing a fluid content 15 which may comprise the usual drilling fluid, water or crude oil, for example. Suspended within the bore hole 10 as by means of a cable 16, there is shown a well logging instrument 17 constructed in accordance with the principles of the invention. The cable 16 may include an outer conductive sheath surrounding one or a plurality of insulated electrical conductors (not individually shown) in order to afford means for conducting electrical signals between the instrument 17 and electrical apparatus at the surface of the earth and for transmitting electrical power from the surface of the earth to the instrument in the bore hole. The details of the surface apparatus are discussed in greater detail below. A measuring apparatus, represented diagrammatically as a wheel 18, is shown at the surface of the earth in contact with the cable 16 and provides means for determining the length of the cable 16 suspended in the bore hole 10 during the course of a logging operation.

The logging instrument 17 comprises an outer housing or casing 19 ordinarily formed of steel in accordance with well-known techniques to withstand the temperatures and pressures commonly encountered in the well logging art. Within the casing 19 there is provided a neutron source 20 capable of producing fast neutrons for irradiating the earth formations along the traverse of the bore hole. The source may comprise a well-known mixture of radium and beryllium which emits a fast neutron flux as well as an incidental gamma radiation flux, or, preferably, the source comprises a so-called gamma-free neutron source such as plutonium-beryllium, polonium-beryllium, or radium D-beryllium or other well-known neutron sources of this type. It is also contemplated that the neutron source may be of the type wherein electrically charged particles are accelerated against a suitable target, for example, wherein deuterons are accelerated against a tritium target. Such sources may be pulsed or otherwise switched on or off as desired. These gamma-free sources are particularly advantageous in that they emit a substantial neutron flux without the presence of substantial gamma ray flux as in the case of a radium-beryllium source. Within the housing 19, spaced from the source 20 along the vertical axis of the instrument 17 there is provided a neutron detector 21 constructed in accordance with principles of the invention to detect neutrons of predetermined energy while being substantially insensitive to gamma radiation. Intermediate the two devices 20, 21 there is provided a shield 22 for preventing undesired radiation produced by the source from reaching the detector 21. The shield 22 may advantageously comprise a layer of moderating material 23 such as paraffin, polyethylene or other hydrogenous material for moderating fast neutrons emitted by the source, followed by a layer of neutron capturing material 24 such as boron for absorbing the moderated neutrons and a third layer of lead or tungsten or other high density material 25 such as tungsten or lead for absorbing gamma rays produced by the source or resulting in the shield or other materials of the instrument 17 due to the neutrons from the source 20.

In order to minimize the influence of variations in the size of the bore hole on the resultant log it is contemplated that the logging instrument 17 may be provided with means for stabilizing the position of the instrument in the bore hole throughout the well log. Advantageously, this may comprise means for decentralizing the instrument such as the resilient bow spring 26 shown attached to the upper and lower ends of the instrument housing 19 as by means of upper and lower bolts or studs 27, 28 which pass through slots (not shown) in the respective ends of the bow spring 26 in order that the bow spring 26 may flex as the instrument 17 passes through portions of the bore hole 10 of varying sizes.

Within the housing 19, shown above the detector 21, there is provided electrical circuit apparatus associated with the operation of the detector 21, identified as the instrument electronics 29, for transmitting a signal from the detector 21 to electrical apparatus at the surface of the earth. The instrument electronics 29 may include an appropriate power supply for the detector 21 as well as pulse shaping, pulse scaling and amplifying apparatus for transmitting signal information over the cable 16 to the surface of the earth according to well-known electronic techniques. At the surface of the earth there is shown coupled to the cable 16 an amplifier 30 for receiving the signals from the logging instrument 17. The output of the amplifier 30 is shown coupled to a ratemeter 31 for providing a signal proportional to the rate-of-occurrence of the radiation detected by the detector 21. The ratemeter 31 may also include pulse shaping circuitry as desired for handling the signal information received over the cable 16 from the detector 21 in the logging instrument 17. The output of the ratemeter 31 is shown coupled to a recorder 32 for making a record or chart of the intensity, i.e. rate-of-occurrence of the radiation detected in the bore hole 10.

It is to be further understood that apparatus for carrying out the teachings of the present invention may involve the use of a logging instrument wherein the ratemeter and associated pulse shaping apparatus may be located in the downhole logging instrument rather than being part of the surface equipment. It is further contemplated that a signal indicative of the rate-of-occurrence of detected radiation may be transmitted to the surface by any known means of transmission such as in the form of frequency modulation information on a suitable carrier wave rather than in the form of a pulse type signal. It is also contemplated that other information may be transmitted from the logging information to the surface along with the neutron signal according to the invention. For example, other logging information such as the natural gamma radiations measured in the bore hole, caliper information, casing collar location information may also be transmitted to the surface along with the neutron logging signal.

It is to be understood that the record made on the recorder 32 may conveniently and advantageously consist of a record of the intensity of the detected radiation plotted in correlation with an indication showing the position of the detector 21 in the bore hole 10 throughout the well log. Accordingly, means shown diagrammatically as a conductive circuit path 33 are provided for coupling a signal from the depth measuring apparatus 18 to the recorder 32.

The details of the detector 21 may be better observed by referring now to FIG. 2 along with FIG. 1. The detector 21 comprises a gamma ray counter 40 of the electrical pulse producing type comprising an outer cylindrical cathode enevelope or wall 41 of metal and a thin wire anode 42 running through the central axis of the cathode 41. The counter 40 is provided with the usual ionizable gaseous filling. Advantageously, the gamma ray counter should be of the high efficiency electrical pulse producing type such as the multiple cathode plate detectors shown and described in U.S. Patent 2,397,701 in the name of D. G. C. Hare. Such counters enable the construction of a very reliable gamma ray detector suitable for well logging use wherein ruggedness, high efficiency and reliability of operation in regions of relatively high temperature are desired. The instrument electronics 29 includes means for applying an appropriate high voltage between the anode 42 and cathode 41 in order to establish the operation of the counter 40 in the Geiger region in a manner well known in the art. Surrounding the wall 41 of the counter 40 there is provided a cylindrical layer 43 of hafnium foil which, as will be described in greater detail hereinafter, is designed for resonance interaction with the neutrons to be detected with resultant emission of gamma rays which are, in turn, detected by the gamma ray counter.

Within the housing 19 and surrounding the detector including the hafnium foil 43 there is next provided a cylindrical layer 44 of high density material such as lead or tungsten for shielding the detector 21 from undesired gamma radiation which might otherwise reach it.

Surrounding the housing 19 in the vicinity of the detector 21 there is advantageously provided a layer 45 of cadmium for intercepting thermal neutrons which might otherwise reach the detector 21. The cadmium layer 45 also prevents the thermal neutrons from reaching the housing 19 of the logging instrument 17 where they might readily be captured with resultant emission of relatively high energy capture rays, some of which might also reach the detector 21 to interfere with the desired neutron signal due to the gamma rays emitted by the hafnium foil 43 as a result of the resonance absorption of neutrons. Other materials for use as the high thermal neutron cross-section material or layer 45 surrounding the outside of the housing 19 include samarium and gadolinium.

The hafnium foil detects resonance neutrons which are those generally referred to as having energies between 1 electron volt and 100 electron volts, thus slightly overlapping the epithermal neutron range of .4 electron volt to 10 electron volts. It is noted that many references define the so-called resonance integral so as to include all energies above .4 electron volt.

The use of hafnium is particularly advantageous as utilized in accordance with the present invention. Hafnium has a resonance integral of 1400 barns, thus, assuring a relatively efficient reaction cross section for neutrons in the resonance integral of .8 electron volt to about 10 electron volts. In this energy range the capture is predominantly due to hafnium isotope No. 177 (see Brookhaven National Laboratories publication No. 325 entitled "Neutron Cross Sections"). Upon capture of a neutron the hafnium isotope No. 177 goes to isotope No. 178 most of which goes immediately to the ground or stable state with the substantially instantaneous emission of gamma radiation. A very small percentage of the neutrons captured by hafnium No. 177 lead to an isomeric state of hafnium isotope No. 178. The isomeric state of hafnium No. 178 has a half life of 4.8 seconds and emits gamma radiation having a maximum energy of .42 million electron volt as it decays by beta emission to tantalum No. 178. It will be seen from the foregoing that the hafnium resonance interaction provides a substantially instantaneous detection time constant since most of the gamma radiation is emitted substantially immediately. Moreover the relatively small percentage of isomeric decays have an acceptable half life of 4.8 seconds. Some of the hafnium resonance capture is also due to hafnium No. 179. For the most part this also results in substantially instantaneous gamma radiation as the isotope No. 179 goes to the ground state. A small percentage of the hafnium No. 178 interactions lead to an isomeric state of hafnium No. 179 which decays by beta emission to tantalum No. 179.

In a typical well logging instrument a high efficiency Geiger counter one (1) inch in diameter may be employed with a surrounding layer of hafnium foil which, in turn, is surrounded by a lead shield of approximately one (1) inch in thickness for shielding the gamma ray detector from capture gamma rays emitted when thermal neutrons are captured external to the logging instrument as well as in the cadmium layer surrounding the instrument. The resonance absorbing material surrounding the gamma ray detector emits gamma rays on capturing resonance neutrons which are detected as an indication of the intensity, i.e. rate-of-occurrence, of the neutrons of the resonance integral.

In the operation of the herein described instrument fast neutrons are emitted by the source 20 and pass outwardly through the casing into the earth formations in the vicinity of the instrument where they are slowed down by materials of the formation, especially by the hydrogen of water or hydrocarbon oil or gas present in the pores of the formation. In regions of the formation having a relatively large quantity of hydrogen the fast neutrons are slowed to a predetermined energy level within a relatively short distance from the source. Thus, at a predetermined distance from the source, beyond the so-called critical distance where the neutron flux is substantially constant despite variations in porosity, i.e. hydrogen content, the flux of neutrons having a given lower energy value will decrease with increasing hydrogen content in the formation. According to the present invention substantially only neutrons in the hafnium resonance integral are detected at a fixed distance from the source beyond the critical distance. Since thermal neutrons are not detected, the presence in the formation of material having an appreciable thermal neutron capture cross section will not substantially affect the logging signal, for example, chlorine in salt water. Likewise, gamma radiation in the formation, whatever its cause, will not substantially affect the logging signal.

In accordance with a further aspect of the present invention the electrical pulse producing detector may be in the form of a gamma radiation sensitive scintillation detector such as that shown, for example, in U.S. Letters Patent 2,752,504 reissued as Re. 24,383. When a scintillation detector is employed, it replaces the high efficiency Geiger type counter positioned within the hafnium layer and surrounding material as shown in FIGURE 1 of the drawing. The hafnium layer may be enclosed within a thermally insulating chamber which encloses all or part of the scintillation detector.

The scintillation detector is particularly advantageous since it may be operated in accordance with a preferred aspect of the invention by appropriate biasing to exclude the detection of gamma radiation below approximately 1 million electron volts in order to exclude the gamma radiation resulting from isomeric transition, as discussed above. In addition, this bias also further insures the exclusion of the degraded gamma radiation reaching the detector from undesired sources such as the natural gamma radiation, neutron capture gamma radiation in the cadmium layer and neutron capture gamma radiation from the formation and well fluid external to the logging instrument.

Obviously, many modifications and variations of the invention, as hereinbefore set forth, may be made without departing from the spirit and scope thereof, and therefore only such limitations should be imposed as are indicated in the appended claims.

I claim:

1. Apparatus for conducting a neutron log of the earth formations traversed by a bore hole comprising an instrument adapted to be passed through the bore hole, said instrument including a source of neutrons for irradiating the earth formations along the traverse of the bore hole, a detector of neutronic radiations resulting in the bore hole due to irradiation of the earth formations, said detector comprising a gamma ray counter of the Geiger type, a predetermined quantity of hafnium foil substantially surrounding the active volume of said gamma ray counter, and shielding means for selectively preventing gamma rays from passing into said counter from regions external of said foil while permitting neutrons to pass from the formations to said foil for detection.

2. Apparatus for conducting a neutron log of the earth formations traversed by a bore hole comprising an instrument adapted to be passed through the bore hole, said instrument including a source of neutrons for irradiating the earth formations along the traverse of the bore hole, a detector of neutronic radiations resulting in the bore hole due to irradiation of the earth formations, said detector comprising a gamma ray counter of the electrical pulse producing type, a predetermined quantity of hafnium foil substantially surrounding the active volume of said gamma ray counter, shielding means for selectively preventing gamma rays from passing into said counter from regions external of said foil while permitting neutrons to pass from the formations to said foil for detection, and means substantially surrounding the active volume of said counter and said hafnium foil for selectively absorbing thermal neutrons in the vicinity of the detector.

3. Apparatus for conducting a neutron log of the earth formations traversed by a bore hole comprising an instrument adapted to be passed through the bore hole, said instrument including a source of neutrons for irradiating the earth formations along the traverse of the bore hole, a sealed metallic housing containing a detector of neutronic radiations resulting in the bore hole due to irradiation of the earth formations, said detector comprising a gamma ray counter of the electrical pulse producing type, a predetermined quantity of hafnium foil within said housing and substantially surrounding the active volume of said gamma ray counter, and means substantially surrounding said housing in the vicinity of said detector for selectively absorbing thermal neutrons while permitting higher energy neutrons to pass into the detector.

4. Apparatus according to claim 3 wherein the metallic housing comprises a substantial quantity of iron and wherein the means surrounding the housing in the vicinity of said detector for selectively absorbing thermal neutrons comprises a layer of cadmium.

5. Apparatus for conducting a neutron log of the earth formations traversed by a bore hole comprising an instrument adapted to be passed through the bore hole, said instrument including a source of neutrons for irradiating the earth formations along the traverse of the bore hole, a detector of neutronic radiations resulting in the bore hole due to irradiation of the earth formations, said detector comprising a gamma radiation detector, a predetermined quantity of hafnium foil adjacent the sensitive detecting portion of said detector, shielding means for selectively preventing gamma radiation from passing into said sensitive detecting portion from regions external of said foil while permitting neutrons to pass from the surrounding environment to said foil for detection.

6. Apparatus as defined in claim 5 further comprising means for rendering said gamma radiation detector effectively insensitive to gamma radiation below a value of about one (1) million electron volts, thereby to exclude undesired low energy gamma radiation including gamma radiation resulting from isomeric transition of hafnium 178 to tantalum 178 as the result of neutron capture by hafnium 177 of said foil.

7. Apparatus as defined in claim 6 wherein said gamma detector is of the scintillation type biased to exclude gamma radiation below a predetermined value of the order of one (1) million electron volts.

References Cited in the file of this patent

UNITED STATES PATENTS

| | | |
|---|---|---|
| Re. 24,383 | McKay | Oct. 29, 1957 |
| 2,493,935 | Weigand et al. | Jan. 10, 1950 |
| 2,552,723 | Koury | May 15, 1951 |
| 2,721,944 | Ruble | Oct. 25, 1955 |
| 2,724,779 | McKay | Nov. 22, 1955 |
| 2,769,915 | Tittle | Nov. 6, 1956 |
| 2,769,918 | Tittle | Nov. 6, 1956 |
| 2,845,560 | Curtis et al. | July 29, 1958 |
| 2,923,825 | Swift | Feb. 2, 1960 |
| 2,951,942 | Kramish | Sept. 6, 1960 |